R. L. HIBBARD.
MILLING MACHINE.
APPLICATION FILED DEC. 2, 1919.

1,378,865.

Patented May 24, 1921.
7 SHEETS—SHEET 1.

FIG.1.

INVENTOR
R. L. Hibbard
By
James C. Bradley
Atty

R. L. HIBBARD.
MILLING MACHINE.
APPLICATION FILED DEC. 2, 1919.

1,378,865.

Patented May 24, 1921.
7 SHEETS—SHEET 5.

INVENTOR
R. L. Hibbard
by
James C. Bradley
atty

R. L. HIBBARD.
MILLING MACHINE.
APPLICATION FILED DEC. 2, 1919.

1,378,865.

Patented May 24, 1921.
7 SHEETS—SHEET 7.

INVENTOR
R. L. Hibbard
by
James C. Bradley
atty

UNITED STATES PATENT OFFICE.

ROBERT L. HIBBARD, OF PITTSBURGH, PENNSYLVANIA.

MILLING-MACHINE.

1,378,865.  Specification of Letters Patent.  Patented May 24, 1921.

Application filed December 2, 1919. Serial No. 341,851.

*To all whom it may concern:*

Be it known that I, ROBERT L. HIBBARD, a citizen of the United States, and a resident of Pittsburgh, in the county of Allegheny and State of Pennsylvania, have made a new and useful Invention in Milling-Machines, of which the following is a specification.

The invention relates to milling machines, and particularly to the type in which the work is rotated between centers by a spindle. The particular machine illustrated is designed to mill the surfaces of crank shafts for automobile engines, such as those illustrated in Figure 11 which are non-concentric with respect to the axis of rotation of the crank shaft, but it will be understood that the machine is adaptable to a wide range of work in which it is desirable to mill surfaces which are not concentric with the axis of rotation of the work. The invention has for its principal objects; the provision of a machine of the type specified having improved means for automatically governing the movement of travel of the milling cutters toward and from the work during the rotation thereof and for giving such cutters any desired path of movement depending upon the contour of the article to be milled; the provision of a machine of the type specified wherein provision is made for automatically varying the speed of rotation of the work to suit the contour of such work and thus render the work imposed upon the milling cutters more uniform; the provision of a machine of the type specified having improved means for securing the withdrawal of the milling cutters out of contact with the work after the work has made a complete revolution, such withdrawal permitting the more convenient removal of the work or an adjustment of the work preliminary to a second cutting operation. One embodiment of the invention is illustrated in the accompanying drawings wherein;

Figs. 3 and 4 are sectional views, diagrammatically arranged for clearness of illustration, of the gear mechanism for driving the spindle, milling cutters and cam shaft controlling the back and forth movement of the cutters. Fig. 11 is a vertical section through the machine showing the mounting of the milling cutters and the cam means for controlling their movements toward and from the work, Fig. 11$^a$ is an enlarged section on the line A—A of Fig. 11, and Fig. 11$^b$ is a side elevation of the cam employed when the cutter is used to mill a crank pin.

Figure 1:
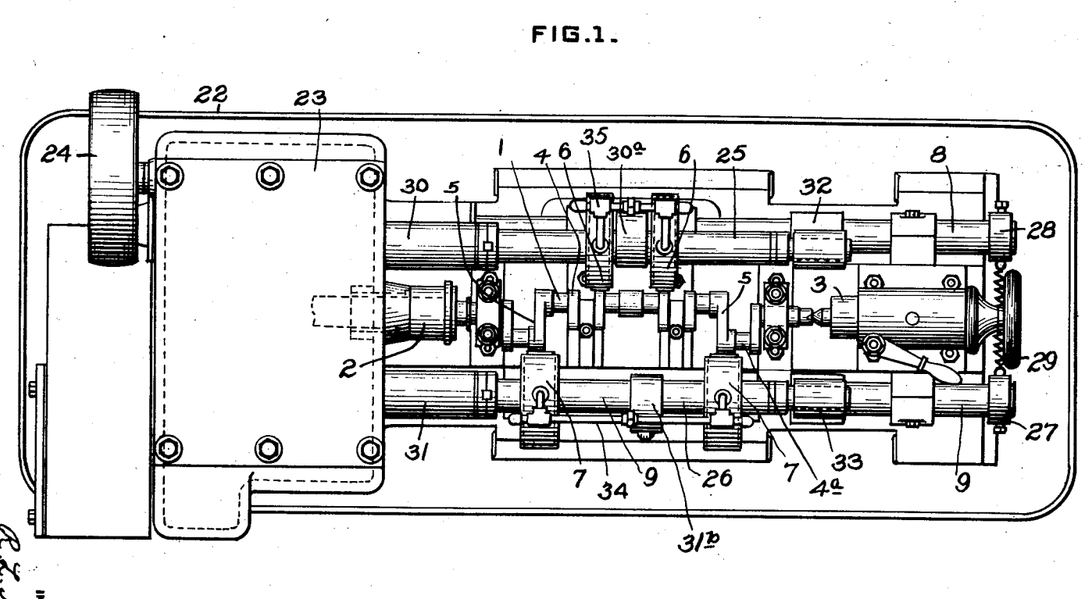
Fig. 1 is a plan view of the complete machine and Fig. 2 is a side elevation thereof.

The machine will be most readily understood by a preliminary consideration of the functions to be accomplished and a general statement as to the means employed. Referring to Fig. 1 in connection with Fig. 11, it will be noted that work comprises an automobile crank shaft 1 mounted for rotation between the spindle 2 and the tail stock 3. and that such crank shaft includes a plurality of non-concentric portions 4 and 5 (see Fig. 11) which it is desired to machine. The portions 4 are machined by a pair of milling cutters 6—6 on one side of the machine, while the portions 5 are machined by a pair of milling cutters 7, 7 on the outer side of the machine, the cutters being mounted for rocking movement around the shafts 8 and 9 extending longitudinally on each side of the machine. Extending longitudinally of the machine beneath the work is a cam shaft 10 carrying the cams 11 and 12. These cams engage rollers 13 and 14 and the lower ends of the rocker arms 15 and 16 by means of which the shafts 8 and 9 are turned and the cutters are moved in and out.

The cams are so shaped as to follow the contour of the members 4 and 5 and finally to carry the cutters out of engagement with the work after a complete revolution thereof, the latter movement being designed to permit of the free removal and replacement of the work. The spindle which turns the work and the cam shaft are preferably geared together so that the work is rotated one and one sixth revolutions while the cam shaft is rotating once, and the cams cause the withdrawal of the cutters during the one sixth revolution of the work following the complete revolution thereof. The depressed portions 17 and 18 of the cams cause the desired withdrawal.

Since the cutter 7 while in the position illustrated and working on the concave portion 19 of the member 5 engages a larger area of the work than when in engagement with the convex portion of the member 5, a greater amount of work per unit of time would be imposed on the cutter at this time unless provision were made to avoid it. The object is accomplished by providing automatic gear shifting means for the drive of the spindle so that the rotation of the work is slowed down when the cutter reaches the concave portion and then speeded up when the concave portion is passed. This function is accomplished by means of another cam 20 (see Fig. 12) also mounted on the cam shaft 10 in connection with suitable gear shifting mechanism. Still another cam 21 on the cam shaft 10 (see Fig. 9) coöperating with the gear shifting mechanism causes the stopping of the movement of the spindle, cam shaft and cutters when the cam shaft has turned through a complete rotation and the cutters withdrawn from the work as heretofore set forth.

Figures 11, 11A:
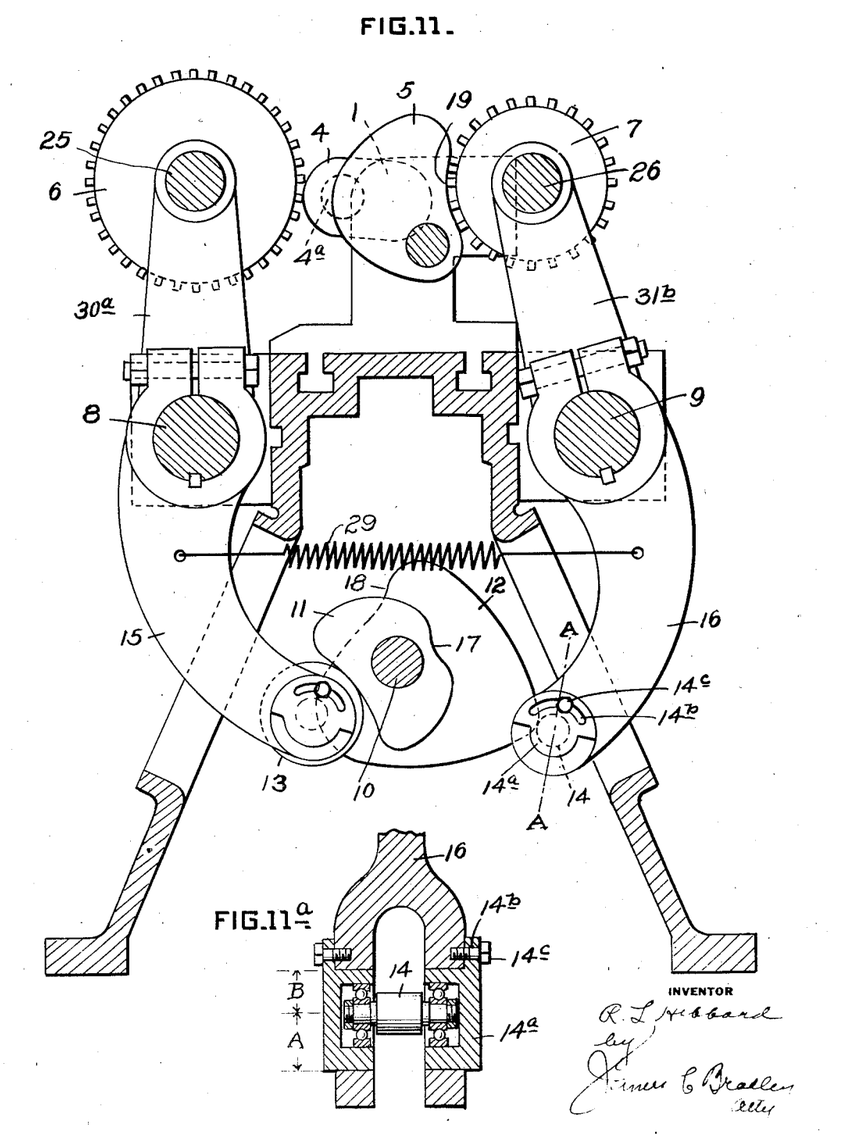

In order to compensate for wear in the cutters 6 and 7, the rollers 13 and 14 are made adjustable. As indicated in Fig. 11$^a$ the ends of the roller are mounted in ball bearings in the sleeves 14$^a$, which sleeves are eccentric with respect to the center line of the roller, the distance A being greater than the distance B. The sleeves are provided with slotted flanges 14$^b$ secured by means of bolts 14$^c$. In this way the center lines of the rollers may be adjusted toward and from the center line of the machine.

The particular gearing and shifting mechanism which I preferably employ and which is illustrated in the drawings, as well as certain other features of construction appearing in the perfected machine but not essential to the invention, will now be described in detail, although it will be understood that my invention is in no way limited to such particular constructions and that many substitute forms of gearing and shifting mechanism might be employed. It will also be understood that the cutters may also be mounted for movement toward and from the work by any means other than rocker arms although this is the simplest method, that the cams may be changed to suit widely varying work, or other operating means aside from cams employed and that the general arrangement of parts may be widely varied to meet requirements which may arise with various classes of work.

Figure 2:
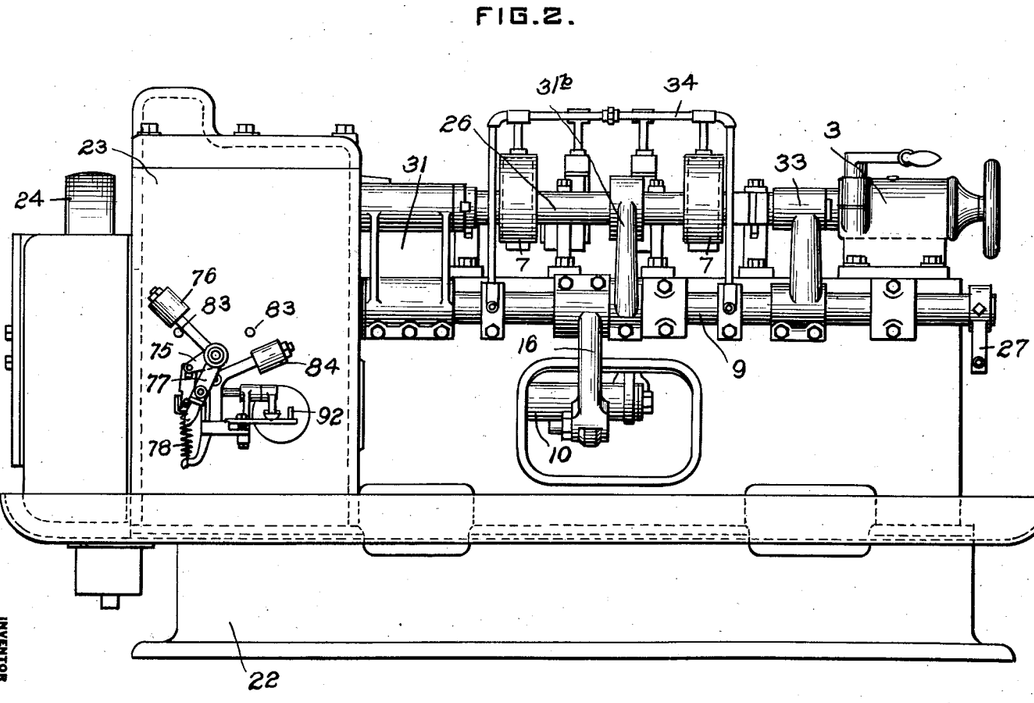

Referring first to Figs. 1 and 2, it will be observed that the mechanism is carried upon a base 22, having at one end the tail stock 3 for engaging one end of the work and having at the other end a casing 23 in which is mounted the transmission gearing by means of which the spindle 2 is driven from the pulley 24, as well as the cam shaft 10 and the shafts 25 and 26 on which the cutters 6, 6 and 7, 7 are mounted.

The ends of the shafts 8 and 9 are extended past the right hand end of the machine and provided with downwardly extending arms 27 and 28 connected by the spring 29, such spring serving to hold the rollers on the rocker arms 15 and 16 (see Fig. 11) in contact with the operating cams. The shafts 25 and 26 which carry the milling cutters and are moved in and out by the rocker arms 15 and 16, are supported at their left hand ends in the bracket arms 30 and 31, and at their right hand ends in the bracket arms 32 and 33, such bracket arms being keyed to the shafts 8 and 9. Intermediate these bracket arms on each side of the machine are the bracket arms 30$^a$ and 31$^b$, also keyed to the rocker shafts at their lower ends and provided with bearings carrying the cutter shafts at their upper ends. The machine is supplied with a suitable oiling system including the piping 34 and 35 and the casings which are shown as surrounding the cutters 6 and 7, such oiling arrangement however constituting no part of my present invention.

The gear mechanism which lies partially in the casing 23 and partially to the left thereof and including the gearing whereby the spindle 2, the cam shaft 10 and the cutter shafts 25 and 26 are driven from the pulley 24, will now be described, reference being had to Figs. 3 and 4 which show the arrangement of the gearing spread out in one plane, and Fig. 8 which shows the major part of such gearing in its actual position. The pulley 24 is mounted upon the shaft 36 which carries at its inner end a pinion 37 loose thereon but adapted to be secured thereto for rotation by means of the clutch 38 which may be of any approved type and requires no description. The pinion 37 drives the gear 38$^a$ mounted on the shaft 39, such shaft being journaled at its ends in suitable bearings, the right hand one of such bearings being mounted in the end of the shaft 8 heretofore referred to (Fig. 11). The shaft 39 also carries a pinion 40 which meshes with a gear 41 on the shaft 42, such shaft in turn being provided with a pinion 43 which engages the idler 44 mounted for rotation on the end of the shaft 8. The idler gear drives the pinion 45 which in turn engages the gear 46 carried on the end of the cutter shaft 25. The shaft 47 which carries the pinion 45 is mounted in a depending arm 48 integral with the bracket arm 30 heretofore referred to as keyed to the shaft 8.

Figures 3, 11B:
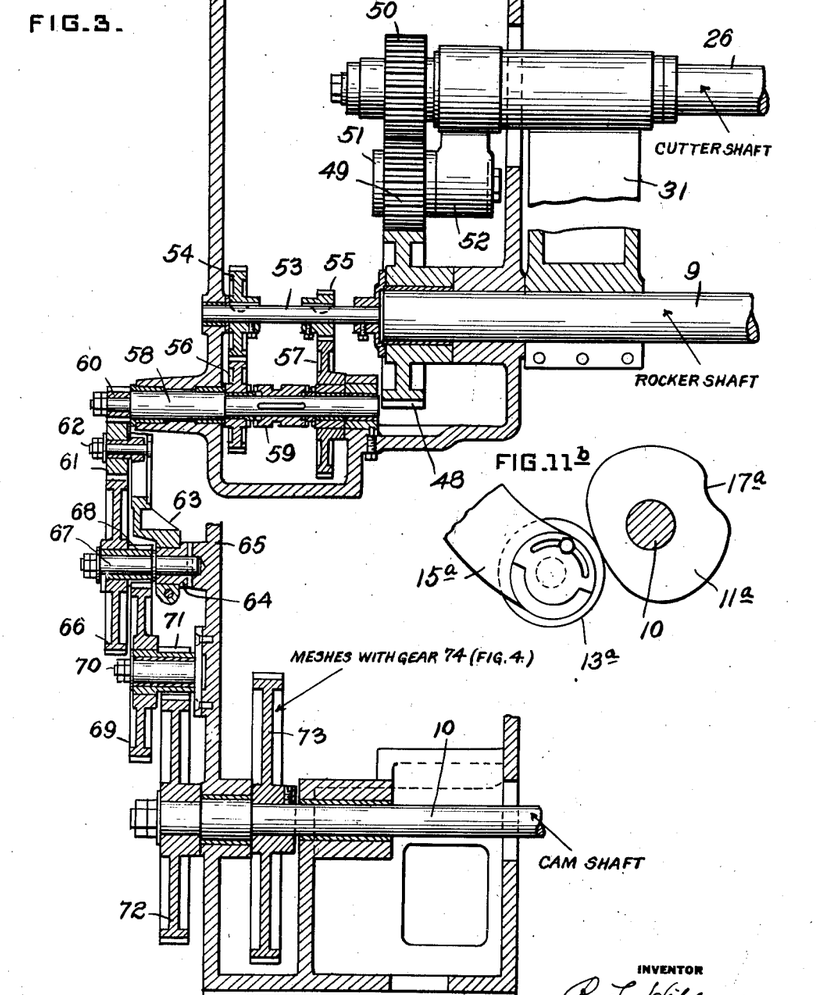
Figure 4:
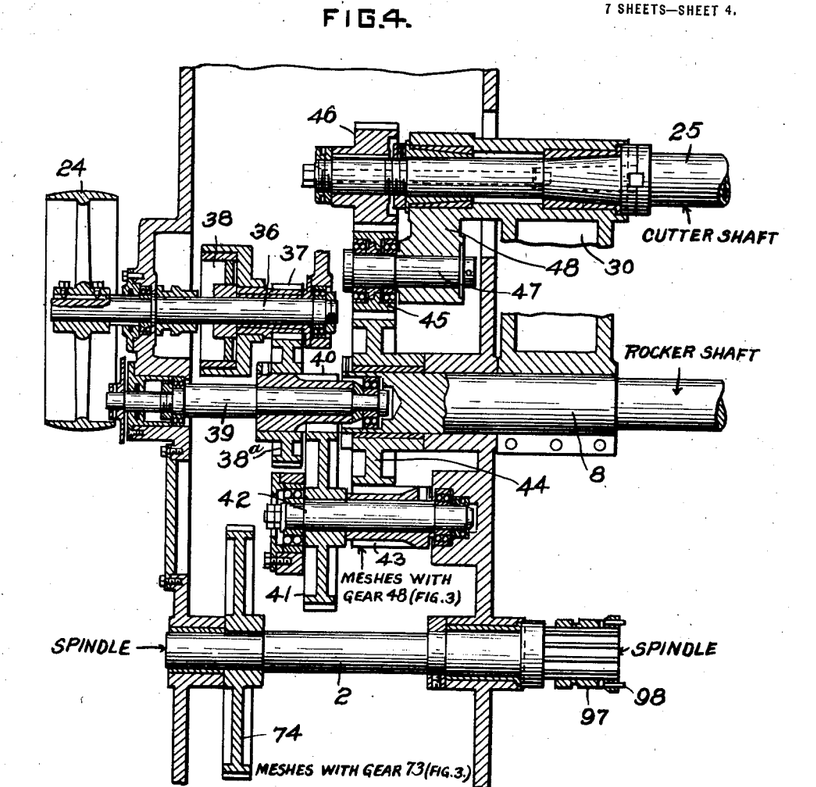
Figure 8:
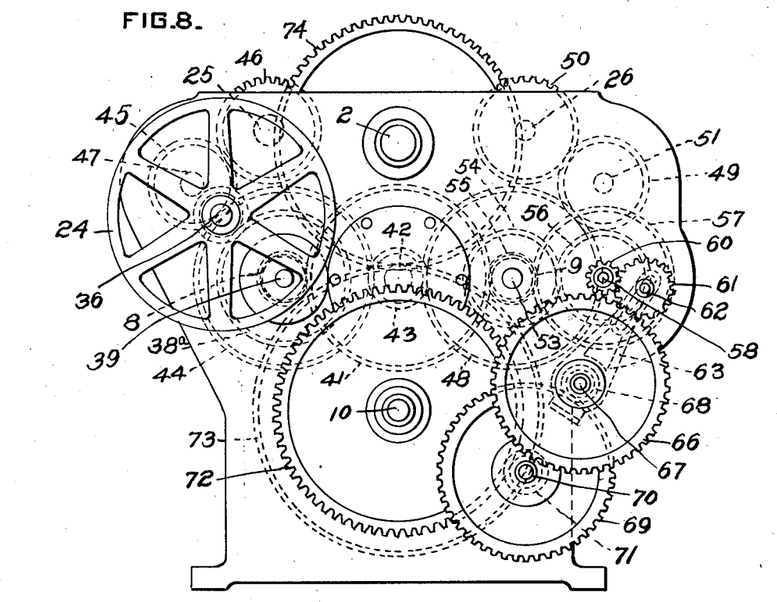
Fig. 8 is an end view of the gear mechanism.

The pinion 43 on the shaft 42 not only drives the gear 44 but also drives a similar gear 48 on the opposite side of the pinion (see Fig. 8 in connection with Fig. 3). This gear 48 is mounted to rotate freely upon the end of the rocker shaft 9 (Fig. 11) and meshes with the gear 49 which drives the gear 50 on the end of the other cutter shaft 26, the shaft 51 upon which the gear 49 is mounted being supported in a depending arm 52 integral with the bracket arm 31.

Secured to the end of the idler gear 48 so as to rotate therewith is a shaft 53 to which are keyed the gears 54 and 55, such gears constituting a part of the change speed mechanism heretofore referred to. These gears mesh with a pair of gears 56 and 57 mounted so as to rotate freely upon the shaft 58, such shaft carrying between the two gears a clutch member 59 which is splined upon the shaft and adapted to drive either one of said gears. The outer end of the shaft 58 is provided with a pinion 60 meshing with a gear 61, mounted for rotation upon the pin 62. This pin is carried upon a supporting arm 63, secured upon the boss 64, projecting from the end plate 65 of the casing. The pin 62 is carried by a slot in the arm so that it may be shifted in case it is desired to change the speed by the use of a gear of different size. The gear 61 engages a gear 66 mounted upon the pin 67. Mounted to turn with the gear 66 is a pinion 68 which drives the gear 69 on the pin 70. This gear also has a pinion 71 mounted to turn therewith and this pinion drives the gear 72, keyed to the end of the cam shaft 10. The cam shaft 10 is provided inside the casing with a gear 73, which gear is in driving engagement with the gear 74, keyed to the spindle shaft 2 as indicated in Fig. 4. The gear 73 has seven-sixths as many teeth as the gear 74 so that as heretofore explained, the spindle and work make one and one-sixth revolutions for each revolution of the cam shaft. That portion of the gearing upon which the heaviest work is placed is located in the casing so that it can run in a bath of oil, while the rest of the gearing is located outside the end of the casing where it is more readily accessible. The gearing as heretofore described is not essential to my invention but is a desirable arrangement because of its compactness and serves to give the necessary speed reductions for driving the cutter, cam and spindle shafts at the necessary relative speeds.

Figure 12:
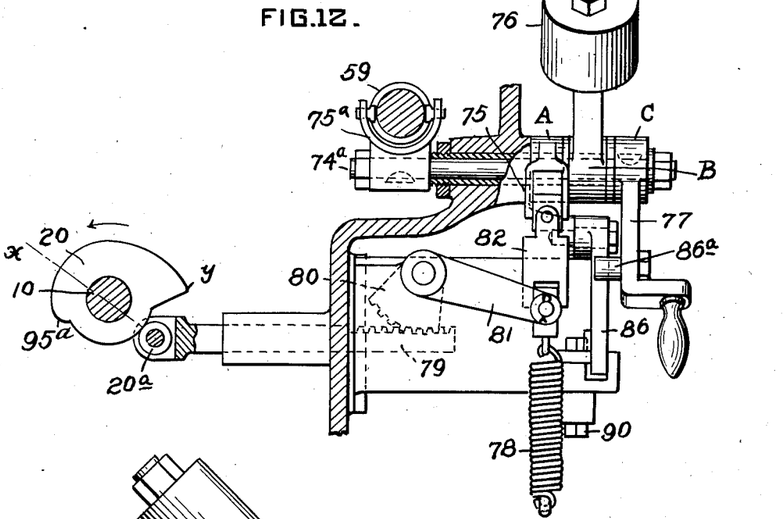
Figs. 12 and 13 are further detail views of the gear shifting and automatic stop devices.
Figure 13:
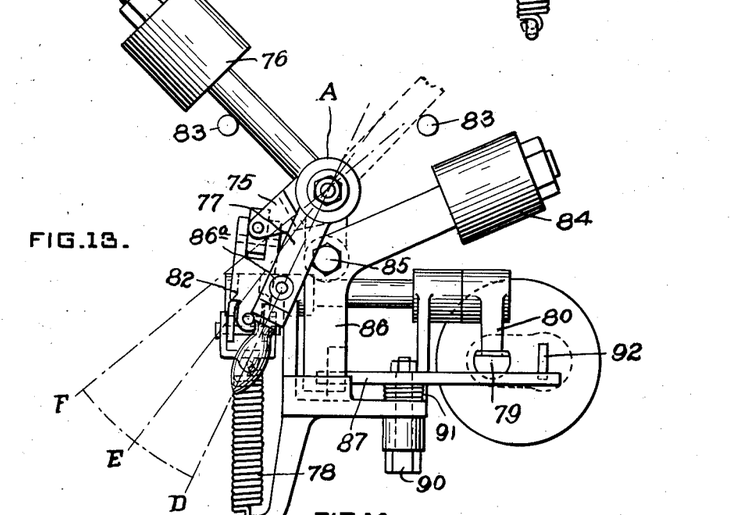

The device for automatically shifting the clutch 59 (Fig. 3) and so changing the speed of rotation of the cam shaft and spindle is shown in Figs. 12 and 13. This device is so arranged that the clutch is in driving engagement with the gear 56 to give the high speed, while the cutters 7 (Fig. 11) are machining the convex portion of the member 5, and in driving engagement with the gear 57 to give the low speed, while the cutters are machining the concave portion 19 of such member. Another part of the device causes a shift of the clutch to middle or neutral position, when the rotation of the work is completed and the cutters withdrawn.

The device is operated from a cam 20 on the cam shaft 10 and includes a lost motion connecting means and a swinging counter weight, which causes the clutch to move quickly from one position to another when the lost motion is taken up. A second counterweight operated from another cam 21 (Fig. 9) coöperates to shift the clutch to neutral position after the rotation of the work is completed.

Figure 5:
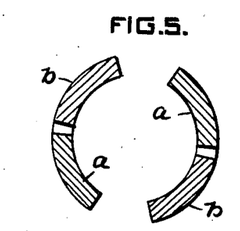
Figs. 5, 6 and 7 are enlarged details of parts of the gear shifting device, Fig. 5 being a section on the line V—V of Fig. 7 and Fig. 6 a section on the line VI—VI, of Fig. 7.
Figure 6:
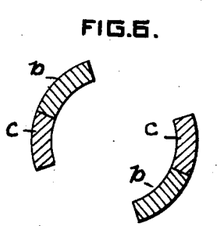
Figure 7:
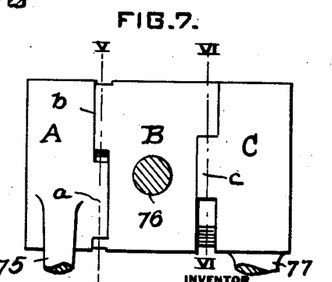

The clutch is operated by a shaft $74^a$ provided with a fork $75^a$ engaging the clutch in the usual way. Mounted on the shaft are three collars A, B and C, the collar C only being keyed to the shaft, and the other two loose thereon. The collar A has an operating arm 75, while the collar B carries the counterweight 76, and the collar C carries the handle 77. The collars A, B and C are provided respectively with the interlocking teeth $a, a, b, b$, and $c, c$, as shown in Figs. 5, 6 and 7, Fig. 5 being a section on the line V—V of Fig. 7 and Fig. 6 a section on the line VI—VI of Fig. 7. This arrangement provides a lost motion connection whereby the collar A first moves the collar B with its weight, and the collar B under the action of the weight then moves the collar C which being keyed to the shaft actuates the clutch. The arm 75 is normally held in its lowest position as illustrated by means of the spring 78, and is moved in the reverse direction by the cam 20 operating through the roller $20^a$, the rack bar 79, the gear segment 80, the arm 81 and the connection 82. The movement of the weight is limited by means of the pins 83 and the lines D, E and F (Fig. 13) indicate the three positions occupied by the handle when the clutch is in high speed, neutral and low speed positions respectively. The handle is moved from high speed position D to low speed position F and back again by the weight 76, while another device serves to automatically move the handle from high speed position D to neutral position E when the rotation of the work is completed.

Figure 9:
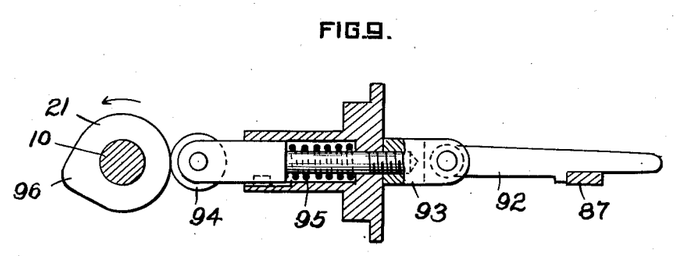
Figs. 9 and 10 are detail views of a part of the automatic stop mechanism.
Figure 10:
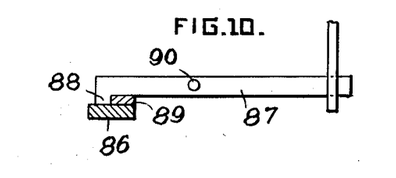

This latter device includes a counter weight 84, pivoted at 85 and provided with a downwardly projecting arm 86 adapted to engage a pin $86^a$ on the handle 77 and move it from position D to position E when the arm 86 is released by the cam 21 (Fig. 9). The arm 86 is held from swinging to the left by means of the bar 87 whose end 88 (Fig. 10) engages the lug 89 on the arm, the bar being pivoted at 90 and normally held in engaging position by the coil spring 91 (Fig. 13). The free end of the bar 87 is actuated to cause the release of the end 88 by means of the bar 92 (Fig. 9) operated from the cam 21, the bar 92 being pivoted to the bar 93 whose roller 94 is held against the cam 21 by means of the spring 95.

The operation of the device is as follows starting with the parts in the positions shown in Figs. 12 and 13, the collars A, B and C and their lugs or teeth at such time occupying the positions shown in Figs. 5, 6 and 7. At this time the work has turned so that the cutters 7 have just finished the concave portion 19 of the member 5 and the speed has just changed from low to high, the cam turning in the direction indicated by the arrow. When the part $95^a$ reaches the roller, the bar 79 is moved to the right, the arm 75 on the collar A is moved up, and such collar A with its teeth $a, a$ moved clockwise, until they engage the teeth $b, b$ and turn the weight 76 a short distance clockwise. This also brings the teeth $b, b$ out of engagement with the teeth $c, c$. The parts occupy this position until the line $x$ of the cam comes opposite the roller $20^a$, when the stop device of Figs. 9 and 10 comes into play. At this time the part 96 comes past the roller 94, moving the bar 92 to the right, thus swinging the bar 87 (Figs. 11 and 13) and releasing the weight 84, which falls, engaging the pin $86^a$ on the handle 77 and swinging such handle from D to E, and moving the clutch 59 to neutral position stopping the rotation of the cam shaft and spindle. The handle 77 is held against movement past the position E, and the clutch from moving past neutral position, by the teeth $c, c$ coming in contact with the teeth $b, b$, the collar B with its weight 76 thus acting as a stop for the handle and clutch.

At this time the rollers 14 and 13 occupy the recesses 18 and 17 respectively in the cams 12 and 11, and the cutters 7 and 6 are withdrawn from the work permitting the insertion of a new crank shaft.

To start the operation again, the weight 84 is first moved up to reset the release device and the handle 77 moved to the high speed position D, turning the teeth $c, c$ counter clockwise to the position shown in Fig. 6 and throwing the clutch so as to engage the gear 56 (Fig. 3). The continued movement of the cam 20 moves the bar 79 to the right, raising the arm 75 and turning the teeth $a, a$ clockwise, so that their engagement with the teeth $b, b$ causes the collar B and weight 75 to turn clockwise. When the weight passes a vertical position it falls, the teeth $b, b$ then engaging the teeth $c, c$ and moving the collar C and handle D sharply from position D to position F and shifting the clutch 59 so that it disengages from the gear 56 and engages the gear 55. The speed of rotation of the work is thus reduced, this change occurring just as the cutters 7 start to cut the concave portion 19 (Fig. 11) of the members 5. At this time the point $y$ on the cam 20 passes the roller $20^a$ and the bar 79 starts to move to the left. The collar B with its weight is thus reversed in movement being now turned counter clockwise until the weight passes center position when it falls, the teeth $b, b$ engaging the teeth $c, c$ and carrying the collar C and handle 77 counter clockwise from low speed position F to high speed position D. This causes the clutch again to engage the gear 56 and the parts to occupy their starting position as shown in Figs. 5, 6, 7, 12 and 13. The cam is so arranged that this last shift occurs just as the cutters 7 leave the concave portion 19 of the work (Fig. 11) and from this point on the cycle proceeds as heretofore described.

Figure 14:
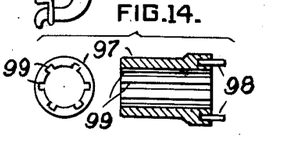
Fig. 14 shows in end elevation and section a detail of the adjusting cap for application to the end of the spindle.

The work 1 is preferably secured to the spindle by means of the collar 97 shown in Fig. 14. This collar is provided with a pair of pins 98 adapted to engage a pair of holes drilled in the end of the work, all of the crank shafts to be machined having a pair of holes drilled in the same position in the end thereof. The sleeve is adapted to slide over the end of the spindle 2 (Fig. 4) and is provided with six equally spaced keyways 99 adapted to engage keys similarly spaced on the end of the spindle. After a crank is machined, the collar is slid back, so that the pins 98 are withdrawn from the crank. Since the work rotates one and one sixth revolutions for each revolution of the cam shaft, due to the arrangement whereby the cutters are withdrawn from the work during the one sixth rotation after the machining operation is complete, it is necessary to re-adjust the sleeve before the insertion of a new crank in order that the cutters may start to cut at the same relative point on the work as before. This is done by removing the sleeve from the spindle and adjusting it backward one sixth of a revolution, the spacing of the keys and keyways insuring a proper adjustment.

The functioning of the machine and its advantages will be readily apparent from the foregoing. The cams 11 and 12 cause the cutters to follow and machine any desired contour of work and adjustments can be made readily to compensate for the wear of the cutters by means of the eccentric sleeves which carry the rollers 13 and 14 (Fig. $11^a$). The indexing arrangement, involving the use of the sleeve 97 above described (Fig. 14) permits the work to be accurately positioned so that the cutters start and finish the cut thereon at the same point and automatically withdraw out of contact with the work at the end of the cut to permit the easy removal of one piece of work and the replacement of another. The change speed device with the controlling shifting device permits the cutters to work to the best advantage regardless of changes in the contour of the work, which changes would otherwise either impose too much work upon the cutters at certain times, or too little at others.

Another advantage incident to the construction involving the use of the cams lies in the flexibility of the machine in its capacity to handle a wide variety of surfaces to be milled by merely substituting cams on the cam shaft 10. Any surface on a crank shaft may be machined including the crank pins and the side surfaces of the crank adjacent the crank pins which may be milled at the same time, all that is necessary being the use of a cam of the proper shape and a milling cutter having both side and edge cutting faces. The cam employed in milling the crank pins 4$^a$ (Figs. 1 and 11) is shown at 11$^a$ in Fig. 11$^b$, such cam having a relief portion 17$^a$ corresponding to the relief portion 17 of the cam 11. This cam may be substituted for the cams 11 when it is desired to mill the crank pins, or may be used in addition to the cams 11 and 12 when it is desired to mill the crank pins at the same time as the parts 4 and 5. The cam is of the shape shown in Fig. 11$^b$ and the parts occupy the position shown in this figure when the cutter 6 is in the relation to the crank pin 4$^a$ illustrated in Fig. 11. The cam will cause the cutter 6 to keep in constant contact with the crank pin throughout the revolution of the crank shaft until the relief portion 17$^a$ is reached when the cutter will be withdrawn.

The gears 46 and 50 might be driven directly from the gears 44 and 48 respectively instead of using the idlers 45 and 49, but in that case the tendency of such gears 44 and 48 (assuming that the driving pinion 43 is rotated in a counter clockwise direction) would be to cause the bracket 30 to rotate in a clockwise direction around the shaft 8, and the bracket 31 to rotate in a counter clockwise direction around the shaft 9. This would tend to cause the cutters on the shaft 25 to move in too hard against the work and the cutters on the shaft 26 to pull away from the work. The use of the idlers 45 and 49 counteracts this tendency and a relatively light spring 29 may be employed to hold the rollers 13 and 14 (Fig. 11) in contact with the operating cams.

What I claim is:

1. In combination in a milling machine, a spindle for rotating the work to be machined, a pivoted rocker arm mounted for movement transversely of the work, a cylindrical milling cutter with its cutting surface upon its cylindrical periphery carried by the arm with its axis of rotation parallel to that of the spindle, a cam for swinging the rocker arm about its point of pivotal support to cause the cutter to approach the work, and means for rotating the work, cutter and cam.

2. In combination in a milling machine, a spindle for rotating the work to be machined, a milling cutter mounted for movement toward and from the work, a cam governing the said movement of the milling cutter, and means for rotating the spindle, cutter and cam, the said cam being provided with a part which causes the withdrawal of the cutter out of contact with the work upon the complete revolution thereof.

3. In combination in a milling machine, a spindle for rotating the work to be machined, a milling cutter mounted for movement toward and from the work, a cam governing the said movement of the milling cutter, and provided with a part which causes the withdrawal of the cutter out of contact with the work after the complete revolution of such work, means for rotating the spindle cutter and cam, and automatic means for stopping said revolution upon said withdrawal of the cutter from the work.

4. In combination in a milling machine, a spindle for rotating the work to be machined, a milling cutter mounted for movement toward and from the work, a cam governing the said movement of the milling cutter and provided with a part which causes the withdrawal of the cutter out of contact with the work after the complete revolution of such work, gearing whereby the spindle is rotated one revolution and a fraction thereof for each revolution of the cam, means for rotating the cutter, and means for adjusting the work about its axis with respect to the spindle in fractions of a revolution equaling the said fraction of a revolution whereby the turning of the spindle exceeds that of the cam.

5. In combination in a milling machine, a spindle for rotating the work to be machined, a milling cutter mounted for movement toward and from the work, a cam governing the said movement of the milling cutter and provided with a part which causes the withdrawal of the cutter out of contact with the work after the complete revolution of such work, gearing whereby the spindle is rotated one revolution and a fraction thereof for each revolution of the cam, means for rotating the cutter, automatic means for stopping the rotation of the cam on the complete revolution thereof, and means for adjusting the work about its axis with respect to the spindle in fractions of a revolution equaling the said fraction of a revolution by which the turning of the spindle exceeds that of the cam.

6. In combination in a milling machine, a driven spindle for rotating the work to be machined, a milling cutter also driven and mounted for movement toward and from the work, a driven cam shaft, a cam thereon governing the said movement of the milling cutter, and provided with a part which causes the withdrawal of the cutter out of contact with the work after the complete revolution of such work, and automatic means including a cam on said cam shaft and a clutch operated thereby for stopping said revolution upon said withdrawal of the cutter from the work.

7. In combination in a milling machine, a spindle for rotating the work to be machined, a milling cutter mounted for movement toward and from the work, a cam governing the said movement of the milling cutter, driving and change speed mechanism for governing the rate of rotation of the spindle, and automatic means for operating such mechanism after the spindle has turned a fraction of one revolution.

8. In combination in a milling machine, a spindle for rotating the work to be machined, a milling cutter mounted for movement toward and from the work, a cam governing the said movement of the milling cutter, driving and change speed mechanism for governing the rate of rotation of the spindle, and automatic means for operating such mechanism after the spindle has turned a fraction of one revolution and for operating such mechanism again to return to the first speed after the spindle has turned a further fraction of one revolution.

9. In combination in a milling machine, a spindle for rotating the work to be machined, a milling cutter mounted for movement toward and from the work, a cam for governing said movement of the milling cutter, driving and change speed mechanism including a second cam and a shiftable clutch for governing the rate of rotation of the spindle, and means governed by such second cam for shifting the clutch to change the speed of turning of the spindle after such spindle has turned a fraction of one revolution.

10. In combination in a milling machine, a spindle for rotating the work to be machined, a milling cutter mounted for movement toward and from the work, a cam for governing said movement of the milling cutter, driving and change speed mechanism including a second cam and a shiftable clutch for governing the rate of rotation of the spindle, and means governed by such second cam for shifting the clutch to change the speed of turning of the spindle after such spindle has turned a fraction of one revolution and for shifting the clutch back to its original position after the spindle has turned a further fraction of one revolution.

11. In combination in a milling machine, a spindle for rotating the work to be machined, a milling cutter mounted for movement toward and from the work, a cam for governing the said movement of the milling cutter, driving and change speed mechanism including a second cam and a shiftable clutch for governing the rate of rotation of the spindle, means governed by such second cam for shifting the clutch to change the speed of turning of the spindle after such spindle has turned a fraction of one revolution and for shifting the clutch back to its original position after the spindle has turned a further fraction of a revolution, and automatic means for shifting the clutch to neutral position to stop the movement of the spindle after the work has rotated a fraction over one revolution.

12. In combination in a milling machine, a spindle for rotating the work to be machined, a milling cutter mounted for movement toward and from the work, a cam for governing the said movement of the milling cutter, driving and change speed mechanism including a second cam and a shiftable clutch for governing the rate of rotation of the spindle, means governed by such second cam for shifting the clutch to change the speed of turning of the spindle after such spindle has turned a fraction of one revolution and for shifting the clutch back to its original position after the spindle has turned a further fraction of a revolution, and automatic means including a third cam and device coöperating with said change speed mechanism for shifting the clutch to neutral position to stop the movement of the spindle after the work has rotated a fraction over one revolution.

13. In combination in a milling machine, a spindle for rotating the work to be machined, a milling cutter mounted for movement toward and from the work, a cam for governing the said movement of the milling cutter, driving and change speed mechanism including a second cam and a shiftable clutch for governing the rate of rotation of the spindle, and means governed by such second cam for shifting the clutch to change the speed of turning of the spindle after such spindle has turned a fraction of one revolution, such means including a lost motion connection between the cam and clutch and a weight for giving the clutch a quick movement of operation.

14. In combination in a milling machine, a spindle for rotating the work to be machined, a pivoted rocker arm mounted for movement transversely of the work, a milling cutter carried by the arm, a cam for moving the rocker arm to cause the cutter to approach the work, a roller on the rocker arm engaging the cam, and means for adjusting the roller relative to the arm.

15. In combination in a milling machine, a spindle for rotating the work to be machined, a pivoted rocker arm mounted for movement transversely of the work, a milling cutter carried by the arm, a cam for moving the rocker arm to cause the cutter to approach the work, eccentric supporting means carried by the arm and adjustable in a rotary direction, a roller carried by said means and engaging the cam, and means for holding the supporting means in its various positions of adjustment.

16. In combination in a milling machine, a spindle for rotating the work to be machined, a pivoted rocker arm mounted for movement transversely of the work, a cam for moving said arm, a shaft mounted in the arm, a cutter carried thereby, a driven spur gear upon the shaft, a driving spur gear beneath said shaft, upon the axis of rotation of the rocker arm, and an idler spur gear mounted to move with the rocker arm and lying to the rear of said shaft, said idler gear engaging said spur gear on the shaft and said driving gear.

17. In combination in a milling machine, a spindle for rotating a crank shaft having a cylindrical surface to be milled, the center of generation of which surface is off center with respect to the center of rotation of the shaft, a pivoted rocker arm mounted for oscillation about a fixed axis transversely of the work, a cylindrical milling cutter with its cutting surface upon its cylindrical periphery carried by the arm, a cam governing the movement of the arm and causing its cutting face to follow the contour of said surface throughout the movement of rotation of the crank shaft, and means for operating the spindle, cutter and cam.

18. In combination in a milling machine, a spindle for rotating a crank shaft having a cylindrical surface to be milled, the center of generation of which surface is off center with respect to the center of rotation of the crank shaft, a milling cutter mounted for movement toward and from the crank shaft, a cam governing the movement of the cutter and causing its cutting face to follow the contour of said surface throughout the movement of rotation of the crank shaft, and means for operating the spindle, cutter and cam, the said cam being provided with a part which causes the withdrawal of the cutter out of contact with the work upon the complete revolution thereof.

19. In combination in a milling machine, a spindle for rotating the work to be machined, a rocker arm pivoted for oscillation about a fixed axis and transversely of the work, a cylindrical milling cutter with its cutting surface upon its cylindrical periphery and with its axis of rotation in parallelism with that of the spindle carried by one end of the arm, a rotating cam for swinging the other end of the arm to cause the cutter to approach the work, and means for rotating the work, cutter and cam.

In testimony whereof, I have hereunto subscribed my name this 14th day of Nov., 1919.

ROBERT L. HIBBARD.